(12) United States Patent
Okabe et al.

(10) Patent No.: US 6,768,946 B2
(45) Date of Patent: Jul. 27, 2004

(54) LIGHTING STRIKE POSITION LOCATING METHOD, APPARATUS, SYSTEM AND PROGRAM

(75) Inventors: Shigemitsu Okabe, Yokohama (JP); Tomomi Narita, Yokohama (JP); Sakae Taniguchi, Yokohama (JP)

(73) Assignee: The Tokyo Electric Power Company, Tokyo (JP)

( * ) Notice: Subject to any disclaimer, the term of this patent is extended or adjusted under 35 U.S.C. 154(b) by 0 days.

(21) Appl. No.: 10/254,474

(22) Filed: Sep. 25, 2002

(65) Prior Publication Data

US 2003/0187580 A1 Oct. 2, 2003

(30) Foreign Application Priority Data

Mar. 29, 2002 (JP) ........................................ 2002-096237

(51) Int. Cl.[7] .............................................. G01W 1/00
(52) U.S. Cl. .......................................... 702/4; 342/460
(58) Field of Search ............................. 702/4; 342/460, 342/465; 324/72

(56) References Cited

U.S. PATENT DOCUMENTS 4,792,806 A * 12/1988 Bent et al. ................. 342/465
5,235,341 A * 8/1993 Effland et al. .............. 342/460
5,510,800 A * 4/1996 McEwan .................... 342/387
6,420,862 B2 * 7/2002 Medelius .................... 324/72

OTHER PUBLICATIONS

Toru Shioda, Lightning Position and Tracking System (LPATS–T)–Support for Operation and Maintenance of Power Equipment, Tokyo Electric Power Co., Inc., Electrical Engineering Department.

* cited by examiner

Primary Examiner—John Barlow
Assistant Examiner—Victor J. Taylor
(74) Attorney, Agent, or Firm—McCormick, Paulding & Huber LLP

(57) ABSTRACT

The present invention provides a method and apparatus for locating the position of a lightning strike free of topography-dependent error by calculating a ground point having a difference in propagation distance at receiving stations (R1, R2 and R3) in at least three different locations. The difference in horizontal distance that would result in arrival time differences at the receiving stations is calculated using the horizontal coordinates of the respective stations. The ground point is taken as the tentative lightning strike position (X). The tentative lightning strike position is then corrected to a lightning strike position obtained by evaluating the arrival time difference in terms of the creepage distances ($L_s$) following depressions and elevations in the ground surface. The depressions and elevations in the ground surface are smoothed to a spatial wavelength that is comparable to the wavelength of the lightning electromagnetic waves.

20 Claims, 8 Drawing Sheets

LONGITUDINAL ERROR(m)

LONGITUDINAL ERROR(m)

LIGHTING STRIKE POSITION LOCATING METHOD, APPARATUS, SYSTEM AND PROGRAM

CROSS REFERENCES TO RELATED APPLICATIONS

This application is entitled to the benefit of and incorporates by reference essential subject matter disclosed in Japanese Patent Application No.2002-96237 filed Mar. 29, 2002.

BACKGROUND OF THE INVENTION

1. Field of the Invention

The present invention relates to a locating method, apparatus, system and program for locating the position of a lightning strike from the time difference of the arrival of lightning electromagnetic waves at several receiving stations, and more particularly relates to a lightning strike position locating method, apparatus, system and program in which there is no error caused by topography.

2. Description of the Related Art

Such lightning strike position locating system is called an "arrival time difference system. As disclosed in, for example, "*Rakurai Ichi Hyotei Sochi (LPATS-T)—Denryoku Setsubi no Unyo—Hoshu Taisaki Shien—[Lightning Position and Tracking System (LPATS-T)—Support for Operation and Maintenance of Power Equipment]—Toru Shioda, Denki Genba Gijutsu* 1998, 7, Special Collection 2, Recent Technical Trends in Lightning Countermeasures, p. 58", an arrival time difference system is conceived by applying the principle that the track of points at which the difference between distance from two ground points (equivalent to the difference between arrival time of electromagnetic waves) is constant can be drawn as a hyperbolic curve. As is shown in FIG. 13 of the present application, when there is a lightning strike at a certain ground point, electromagnetic waves generated in the vicinity of the ground surface by this lightning strike (hereafter referred to as "lightning electromagnetic waves") are propagated to the receiving stations R1, R2 and R3 with the respective arrival times T1, T2 and T3. In this case, if time measurement is synchronized among the respective receiving stations so that the instants in time at which the lightning electromagnetic waves arrive at the respective receiving stations can be measured, the arrival time difference among the respective receiving stations can be determined solely from the instants in time at which the lightning electromagnetic waves arrive. Accordingly, on the basis of the above-mentioned principle, hyperbolic curves L12 and L23 corresponding to, arrival time differences, determined by the difference between distance from two arbitrary points, can be determined. Consequently, if the lightning electromagnetic waves are received by receiving stations in at least three different locations, the intersection point X of the hyperbolic curves can be located as the point where the lightning electromagnetic waves are generated, i.e., as the lightning strike position.

FIG. 14 shows the construction of a conventional lightning strike position locating system. As is shown in this figure, a conventional lightning strike position locating system comprises receiving stations R1, R2 and R3 in at least three different locations which receive the lightning electromagnetic waves generated by the lightning strike, and a lightning strike position locating apparatus H' which determines the difference between the arrival times of the electromagnetic waves that arrive at the respective receiving stations R1, R2 and R3, uses the horizontal coordinates of the respective receiving station as a reference to calculate a ground point which has a difference in horizontal distance that would result in such arrival time difference, and takes this ground point as the lightning strike position. The lightning strike position locating apparatus H' obtains the horizontal coordinates of the respective receiving stations R1, R2 and R3 from a receiving station coordinate memory 3 that stores the horizontal coordinates of the respective receiving stations R1, R2 and R3, and locates the lightning strike position by the above-mentioned principle using these horizontal coordinates as a reference. The results of the location process are displayed by a display device 6, or are stored in memory, printed and sent to a terminal.

Furthermore, in terms of the above-mentioned principle, it is sufficient if there are receiving stations in three different locations; however, it would also be possible to install receiving stations in four or more locations, and to select three appropriate stations for use in the location process. There is also an empirical rule that the position location process becomes more accurate as the positions of the receiving stations that are used are located at a greater distance from the lightning strike position. Accordingly, receiving stations are ordinarily installed at several locations over a broad area. For example, in Japan, the location of lightning strike positions throughout the entire Kanto, Chubu and Niigata regions has been realized by installing receiving stations at a total of six locations including Kashima, Fukushima, Kashiwazaki, Matsumoto and so on.

Furthermore, the horizontal distance between two points used in a conventional lightning strike position locating system is actually a distance that follows the curvature of the earth; for the sake of simplicity, however, this will be described as a distance connecting two points by a straight line in the present specification.

Errors have been confirmed in lightning strike positions located by such a conventional lightning strike position locating system. Using steel towers for which lightning strikes could be confirmed, the present applicant investigated the discrepancies between the actual positions of steel towers receiving lightning strikes and the positions of these steel towers located by means of a lightning strike position locating system in this case. As a result, it was demonstrated that a shift in the located position by a specified distance in a specified direction occurred when a specified combination of receiving stations was used for lightning strikes on steel towers in a specified region.

The present applicant judges that the cause of such discrepancies was topography. Specifically, lightning electromagnetic waves have the property of propagating along the ground surface. If there are depressions and elevations (also called "undulations") in the ground surface, the propagation path as viewed from the lateral direction is not rectilinear, but includes indentations and projections. Since the time at which lightning electromagnetic waves arrive at a receiving station from the lightning strike position should depend on the creepage distance following depressions and elevations in the ground surface, the difference between arrival times should be evaluated using creepage distances. In conventional techniques, however, the above-mentioned arrival time difference system in which the ground surface is viewed as an ideal horizontal plane that has no depressions or elevations is employed; accordingly, the difference between arrival times is evaluated using horizontal distances. As a result, in the case of the location of lightning strike positions in the above-mentioned Kanto, Chubu and Niigata regions, there is a conspicuous discrepancy in the located positions of lightning strikes occurring in areas located on the other side of mountainous regions as seen from the receiving stations.

SUMMARY OF THE INVENTION

Accordingly, it is an object of the present invention to provide a lightning strike position locating method, apparatus, system and program which solve the above-mentioned problems, and which are free of topography-dependent error.

In order to achieve the above-mentioned object, the present invention provides a lightning strike position locating for locating the position of a lightning strike on the basis of a differences in the times at which lightning electromagnetic waves are received by a plurality of receiving stations, wherein the lightning strike position is located so that the distances from the lightning strike position to the receiving stations are creepage distances following depressions and elevations in the ground surface.

The above-mentioned depressions and elevations in the ground surface may be smoothed to a spatial wavelength that is comparable to the wavelength of the lightning electromagnetic waves.

Furthermore, the lightning strike position locating method of the present invention is a lightning strike position locating method for locating the position of a lightning strike by calculating a ground point having a difference in propagation distance that would result in such arrival time difference by using the difference between the times at which electromagnetic waves generated by the lightning strike arrive at receiving stations in at least three different locations, wherein a ground point having a difference in horizontal distance that would result in such arrival time difference is calculated using the horizontal coordinates of the respective receiving stations as a reference, this ground point is taken as the tentative lightning strike position, and, on the basis of this tentative lightning strike position, the position is corrected to a lightning strike position obtained by evaluating the arrival time difference in terms of the creepage distances following depressions and elevations in the ground surface.

The above-mentioned correction may be accomplished by determining the creepage distances from the tentative lightning strike position to the respective receiving stations following depressions and elevations in the ground surface, using the ratios of these creepage distances to the horizontal distances between the tentative lightning strike position and the respective receiving stations to estimate the times at which horizontal electromagnetic waves should arrive at the respective receiving stations from ground points on lines connecting the tentative lightning strike position and the respective receiving stations, and relocating the lightning strike position using the difference between these estimated arrival times.

The above-mentioned creepage distances may be determined by smoothing the depressions and elevations in the ground surface to a spatial wavelength that is comparable to the wavelength of the lightning electromagnetic waves.

The above-mentioned correction may be accomplished by envisioning a group of regions that are spaced at fixed distances in the longitudinal and lateral directions on a map, setting a correction amount for the lightning strike position which takes into consideration the creepage distances from a representative point within the region to the respective receiving stations in a correction amount map for each region beforehand, using this correction amount map to refer to the correction amount in the region in which the tentative lightning strike position is contained, and correcting the lightning strike position by applying this correction amount to the tentative lightning strike position.

Furthermore, the lightning strike position locating apparatus of the present invention is a lightning strike position locating apparatus for locating the position of a lightning strike by calculating a ground point having a difference in propagation distance that would result in such arrival time difference by using the difference between the times at which electromagnetic waves generated by the lightning strike arrive at receiving stations in at least three different locations, this apparatus comprising tentative locating means that use the horizontal coordinates of the respective receiving stations as a reference to calculate a ground point having a difference in horizontal distance that would result in such arrival time difference, and that take this ground point as the tentative lightning strike position, and correction means that correct the tentative lightning strike position to a lightning strike position obtained by evaluating the arrival time difference in terms of the creepage distances following depressions and elevations in the ground surface, on the basis of the above-mentioned tentative lightning strike position.

The above-mentioned correction means may comprise creepage distance calculating means that determine the creepage distances from the tentative lightning strike position to the respective receiving stations following depressions and elevations in the ground surface, arrival time estimating means that use the ratios of these creepage distances to the horizontal distances between the tentative lightning strike position and the respective receiving stations to estimate the times at which horizontal electromagnetic waves should arrive at the respective receiving stations from ground points on lines connecting the tentative lightning strike position and the respective receiving stations, and re-locating means that re-locate the lightning strike position using the difference between these estimated arrival times.

The above-mentioned re-locating means may also act as the above-mentioned tentative locating means.

The above-mentioned creepage distance calculating means may determine creepage lines that express depressions and elevations in the ground surface by smoothing elevation waveforms on lines connecting the tentative lightning strike position and the respective receiving stations, obtained by searching a map data base that provides map information including elevations, to a spatial wavelength comparable to the wavelength of the lightning electromagnetic waves, and may calculate the lengths of these creepage lines as creepage distances.

The above-mentioned creepage distance calculating means may successively average a plurality of elevation data at a specified sampling interval in the horizontal direction provided by said map data base, and thus convert these data into elevation data at a sampling interval that is comparable to the wavelength of the lightning electromagnetic waves.

The above-mentioned correction means may comprise a correction amount map in which a group of regions that are spaced at fixed distances in the longitudinal and lateral directions are envisioned on a map, and a correction amount for the lightning strike position which takes into consideration the creepage distances from a representative point within the region to the respective receiving stations is set for each region beforehand, and map reference means that refer to the correction amount in the region in which the tentative lightning strike position is contained, and that correct the lightning strike position by applying this correction amount to the tentative lightning strike position.

The above-mentioned correction amount map may be a map in which a group of regions are envisioned dividing the longitude and latitude by specified numbers of degrees, and amounts of shift in longitude and latitude that are to be added to the tentative lightning strike position are set for each region.

The above-mentioned correction amount map may be a map in which correction amounts are set to correspond to sets of receiving stations in three arbitrary locations, and the above-mentioned map reference means may refer to correction amounts corresponding to the set of receiving stations in three different locations used in said tentative location means.

Furthermore, the lightning strike position locating system of the present invention is a lightning strike position locating system which comprises receiving stations in at least three different locations that receive lightning electromagnetic waves generated by a lightning strike, and a lightning strike position locating apparatus that locates the lightning strike position by determining the difference between the arrival times of the lightning electromagnetic waves at the respective receiving stations and using the coordinates of the respective receiving stations as a reference to calculate a ground point having a difference in propagation distance that would result in such arrival time difference, wherein the above-mentioned lightning strike position locating apparatus is the lightning strike position locating apparatus according to any of claims 7 through 14.

A data map base may exist that can be referred to by communications from the above-mentioned lightning strike position locating apparatus.

A correction amount map may exist that can be referred to by communications from the above-mentioned lightning strike position locating apparatus.

Furthermore, the lightning strike position locating program of the present invention is a lightning strike position locating program for locating the position of a lightning strike by calculating a ground point having a difference in propagation distance that would result in such arrival time difference by using the difference between the times at which electromagnetic waves generated by the lightning strike arrive at receiving stations located in at least three different locations to, said program causing a computer to execute: an input procedure for inputting a tentative lightning strike position that is obtained by calculating a ground point having a difference in horizontal distance that would result in such arrival time difference, using the horizontal coordinates of the respective receiving stations as a reference; a map data search procedure for searching a map data base that provides map information including elevations; a creepage line extraction procedure for determining creepage lines that express depressions and elevations in the ground surface by editing elevation waveforms on lines that connect the tentative lightning strike position and the respective receiving stations as obtained from said map information and converting these elevation waveforms to a sampling interval that is comparable to the wavelength of the lightning electromagnetic waves; a creepage distance calculating procedure for determining surfaces distances by a distance integration of these creepage lines; an arrival time estimating procedure for estimating times at which horizontal electromagnetic waves should arrive at the respective receiving stations from ground points on lines connecting the tentative lightning strike position and the respective receiving stations by using the ratios of these creepage distances to the horizontal distances between the tentative lightning strike position and the respective receiving stations; and a re-locating procedure for relocating the lightning strike position by using the difference between these estimated arrival times.

Furthermore, the lightning strike position locating program of the present invention is a lightning strike position locating program for locating the position of a lightning strike by calculating a ground point having a difference in propagation distance that would result in such arrival time difference by using the difference between the times at which electromagnetic waves generated by the lightning strike arrive at receiving stations in at least three different locations, said program causing a computer to execute: an input procedure for inputting a tentative lightning strike position obtained by calculating a ground point having a difference in horizontal distance that would result in such arrival time difference, using the horizontal coordinates of the respective receiving stations as a reference; and a correction amount map reference procedure for referring to a correction amount in the region containing the tentative lightning strike position using a correction amount map in which a group of regions that are spaced at fixed distances in the longitudinal and lateral directions are envisioned on the map, and a correction amount for the lightning strike position which takes into consideration the creepage distances from a representative point within the region to the respective receiving stations is set beforehand for each region, and correcting the lightning strike position by applying this correction amount to the tentative lightning strike position.

The above-mentioned input procedure may input the tentative lightning strike position by communications over the internet or the like.

DESCRIPTION OF THE PREFERRED EMBODIMENTS

One embodiment of the present invention will be described in detail below with reference to the attached figures.

Figure 1:
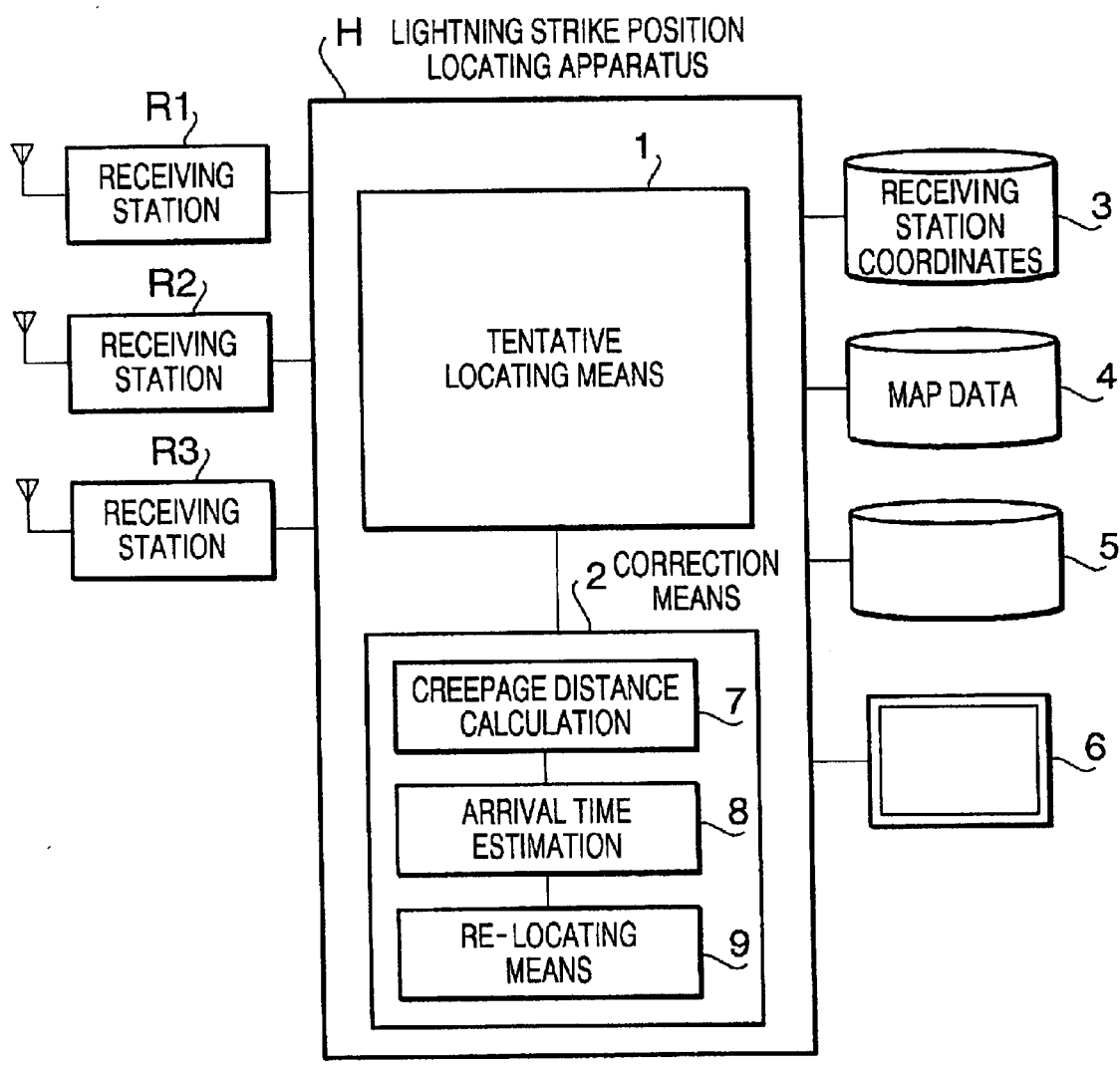
FIG. 1 is a structural diagram of a lightning strike position locating system illustrating one embodiment of the present invention.

As is shown in FIG. 1, the lightning strike position locating system of the present invention comprises receiving stations R1, R2 and R3 in at least three different locations which receive lightning electromagnetic waves generated by lightning strikes, and a lightning strike position locating apparatus H which determines the difference between the arrival times of the lightning electromagnetic waves at the respective receiving stations R1, R2 and R3, and uses the coordinates of the respective receiving stations to calculate a ground point which has a difference in propagation distance that would result in such arrival time difference.

The receiving stations R1, R2 and R3 are conventional receiving stations. Although details are not shown in the figures, each receiving station comprises an antenna that inputs electromagnetic waves, waveform memory means that measure and store the waveform of the electromagnetic waves, characteristic extraction means that extract characteristic portions of the occurrence of the lightning strike from this waveform of the electromagnetic waves, synchronizing means that synchronize the time measurements performed at the respective receiving stations, time detection means that detect the instant in time at which the characteristic portions are extracted as the time of occurrence of the lightning strike, and notification means that notify the lightning strike position locating apparatus H of this time of detection as the instant in time at which the lightning electromagnetic waves arrive at the receiving station in question.

The lightning strike position locating apparatus H comprises tentative locating means 1 which use the horizontal coordinates of the respective receiving stations R1, R2 and R3 as a reference to calculate a ground point having a difference in horizontal distance that would result in the above-mentioned difference between arrival times at the respective receiving stations, and which take this ground point as the tentative lightning strike position, and correction means 2 which correct the position to a lightning strike position obtained by evaluating the difference between arrival times in terms of creepage distances following depressions and elevations in the ground surface, on the basis of the above-mentioned tentative lightning strike position.

The tentative locating means 1 are basically the same as the conventional lightning strike position locating apparatus H' already described. In the present embodiment, a system is employed in which the results of the location process performed by this conventional lightning strike position locating apparatus H' are taken as the tentative lightning strike position, and this lightning strike position is corrected by the correction means 2. Of course, the difference between the times at which the lightning electromagnetic waves arrive at the respective receiving stations R1, R2 and R3 may also be evaluated directly in terms of creepage distances; however, it was found that in the case the system of the present invention, in which the tentative lightning strike position is determined by a conventional system that allows easy calculations using hyperbolic curves, the working of the system is simple, and the results of the location process also make it possible to achieve an effective improvement of the positional discrepancies compared to a conventional system.

3 indicates a receiving station coordinate memory that stores the coordinates of the receiving stations R1, R2 and R3. 4 indicates a map data base. 5 indicates an operating memory that stores necessary data generated during calculations, such as elevation waveforms, creepage distances, estimated arrival times and the like. 6 indicates a display device that displays the results of the location process. The results of the location process can also be sent to a printer, memory device of terminal device not shown in the figures.

The correction means 2 comprise creepage distance calculating means 7 that calculate the creepage distances from the tentative lightning strike position to the respective receiving stations R1, R2 and R3 following depressions and elevations in the ground surface, arrival time estimating means 8 that using the ratios of these creepage distances to the horizontal distances between the tentative lightning strike position and the respective receiving stations R1, R2 and R3 to estimate the times at which horizontal electromagnetic waves should arrive at the respective receiving stations R1, R2 and R3 from ground points on lines connecting the tentative lightning strike position and the respective receiving stations R1, R2 and R3, and re-locating means o that re-locate the lightning strike position using the difference between this estimated arrival times.

The creepage distance calculating means 7 determine creepage lines that express depressions and elevations in the ground surface by smoothing the altitude waveforms on lines connecting the tentative lightning strike position and the respective receiving stations (obtained by searching the map data base 4 that provides map information including elevations) to a spatial wavelength that is comparable to the wavelength of the lightning electromagnetic waves, and calculate the lengths of these creepage lines as creepage distances. The map data base 4 may use an existing map such as the Kokudo Chiriin Suchi Chizu [Japanese Topographical Society Numerical Map]. However, the Kokudo Chiriin Suchi Chizu provides elevations at a sampling interval of 50 m in the horizontal direction. In cases where elevation information is thus obtained from an existing map data base 4, the sampling interval is converted to a sampling interval that is comparable to the wavelength of the lightning electromagnetic waves, for reasons that will be described later. For example, data with a sampling interval of 50 m is averaged for 40 consecutive intervals, thus producing data with a sampling interval of 2000 m. Of course, a map data base 4 may also be constructed with a sampling interval comparable to the wavelength of the lightning electromagnetic waves for use in the lightning strike position locating system of the present invention.

The arrival time estimating means 8 calculate estimated arrival times using Equation (1) described later.

The re-locating means 9 locate the lightning strike position by applying the instants in time at which the horizontal electromagnetic waves arrive at the respective receiving stations R1, R2 and R3 from the tentative lightning strike position (derived from the estimated arrival times) to the arrival time difference system. An apparatus that is the same as the conventional lightning strike position locating apparatus H' can be used as the re-locating means 9. In the case of the tentative locating means 1, position location is accomplished by inputting the actual arrival times for the respective receiving stations; in the case of the relocating means 9, on the other hand, position location is accomplished by inputting estimated arrival times. In the embodiment shown in FIG. 1, the tentative locating means 1 and re-locating means 9 are separate; however, the present invention could also be embodied in a design in which the tentative locating means 1 are also used as the re-locating means 9, and the output of the arrival time estimating means 8 is processed by the tentative locating means 1.

Next, the principle and operation of the present invention will be described.

Figure 2:
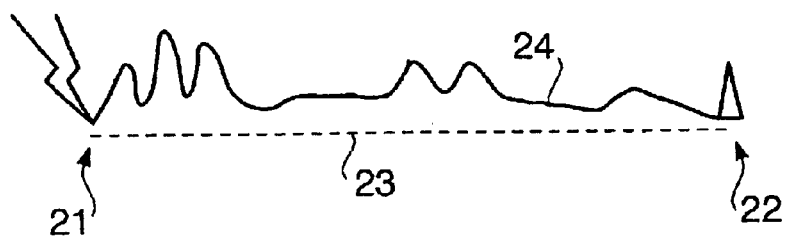
FIG. 2 is a topographical sectional view which is used to illustrates the concept of creepage distance in the present invention.

There are depressions and elevations in the ground surface between two arbitrary ground points on the ground. For example, as is shown in FIG. 2, if the tentative lightning strike position 21 and a receiving station 22 are connected by a' horizontal straight line 23, a horizontal distance $L_h$ is obtained. However, an elevation waveform (creepage line) 24 based on elevation data can be formed between these two ground points. The lightning electromagnetic waves propagate along the depressions and elevations in the ground surface expressed by this elevation waveform 24. Accordingly, the creepage distance $L_s$ obtained by distance integration of the creepage line should actually determine the arrival time of the lightning electromagnetic waves.

In a conventional system, however, it is assumed that the lightning electromagnetic waves propagate horizontally regardless of the depressions and elevations in the ground surface (that is, the ground surface is viewed as an ideal horizontal plane without any depressions or elevations); accordingly, the position is located using arrival times that are longer than the actual arrival times. In regard to the true lightning strike position, the horizontal distance $L_h$ should be closer than the tentative lightning strike position 21 as viewed from the receiving station 22. Furthermore, the true lightning strike position is not necessarily on the line that connects the tentative lightning strike position 21 and the receiving station 22. In other words, the bearing seen from the receiving station 22 is not necessarily the same in the case of the tentative lightning strike position 21 and in the case of the true lightning strike position. However, if the bearing seen from the receiving station 22 is changed, the shape of the creepage line 24 also changes.

Accordingly, in the present invention, the bearing is not changed, and it is provisionally assumed that the lightning strike position is located on a line that connects the tentative lightning strike position 21 and the receiving station 22. The time at which the horizontal electromagnetic waves should arrive at the receiving station 22 from this provisional ground point is estimated. Accordingly, the arrival time correction equation that is calculated by the arrival time estimating means 8 is as follows:

Estimated arrival time=conventional system arrival time×horizontal distance $L_h$/creepage distance $L_s$     Equation (1)

Here, the conventional system arrival time is the time obtained by subtracting the instant in time at which the lightning strike occurs, which is output by the tentative locating means 1, from the instant in time at which the lightning electromagnetic waves arrive [at the receiving station 22], which is detected by the receiving station 22. The creepage distance $L_s$ is determined by the creepage distance calculating means 7. The horizontal distance $L_h$ can be determined from the coordinates of the receiving station 22 and the coordinates of the tentative lightning strike position 21.

The arrival time estimating means 8 determine the estimated arrival times for the respective receiving stations R1, R2 and R3 by the calculation shown in Equation (1). The three provisional ground points are respectively different. Each provisional ground point does not satisfy the estimated arrival times of the other two points. However, a ground point that satisfies the three estimated arrival times exists separately, and this ground point appears to be close to the true lightning strike position. In the present invention, this ground point is determined by correction. Specifically, it is assumed that the horizontal electromagnetic waves generated at the lightning strike position are received by the respective receiving stations R1, R2 and R3 following the estimated arrival times.

The estimated instants of arrival corresponding to these estimated arrival times are calculated and input into the relocating means 9. The re-locating means 9 perform a position location process using an arrival time difference system in which the ground surface is viewed as a horizontal plane, and can output an accurate position location result in cases where the horizontal electromagnetic waves are received by the respective receiving stations R1, R2 and R3. Accordingly, the lightning strike position can be accurately located by inputting estimate arrival instants assumed to be the instants in time at which the horizontal electromagnetic waves from the lightning strike position are received by the respective receiving stations R1, R2 and R3. Specifically, the tentative lightning strike position is corrected so that this position approaches the true lightning strike position.

Next, the spatial wavelength that is used when creepage distances are determined will be described. The elevations provided by the map data base 4 have a specified sampling interval in the horizontal direction. When creepage distances are determined, the calculated creepage distances obtained in cases where data with a narrow sampling interval is used differ from those obtained in cases where data with a broad sampling interval is used. Meanwhile, lightning electromagnetic waves belong to a frequency band of several hundred kHz, so that the wavelength of such lightning electromagnetic waves is several thousand meters. It is difficult to conceive that lightning electromagnetic waves would propagate in a fine manner along depressions and elevations in the ground surface that are smaller than the wavelength of the lightning electromagnetic waves. Accordingly, it would appear to be appropriate to determine creepage distances by smoothing depressions and elevations in the ground surface so that spatial wavelengths that are shorter than a spatial wavelength comparable to the wavelength of the lightning electromagnetic waves are eliminated.

Figure 3:
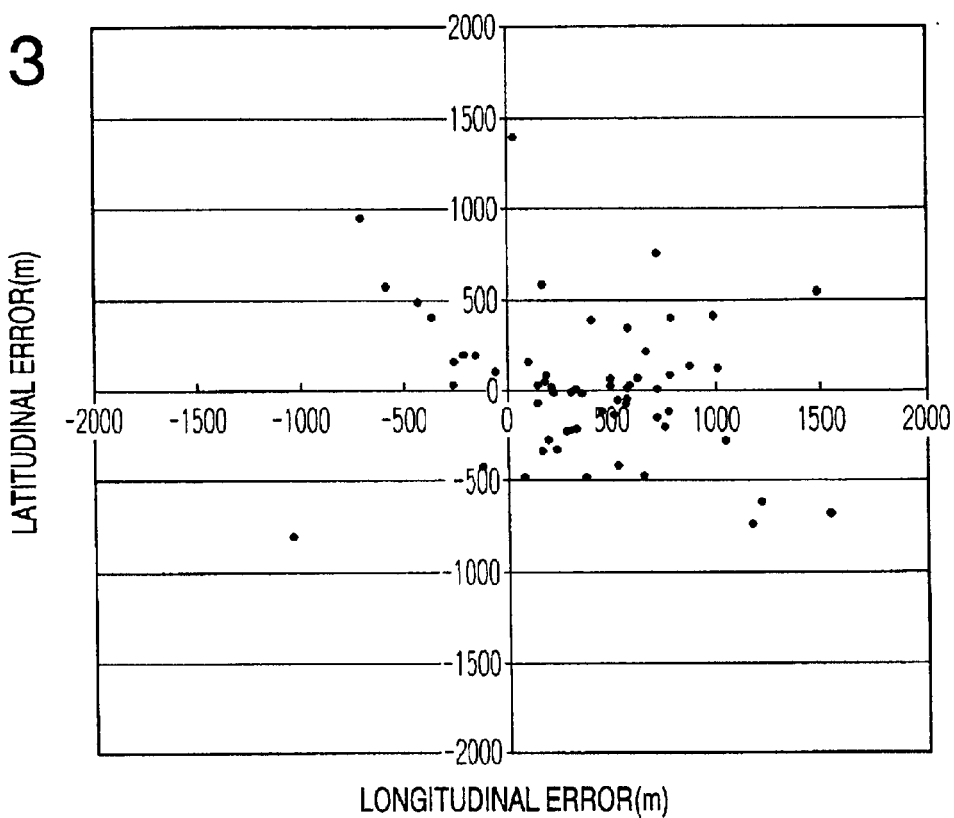
FIG. 3 is an error distribution diagram of lightning strike positions in a conventional system.
Figure 4:
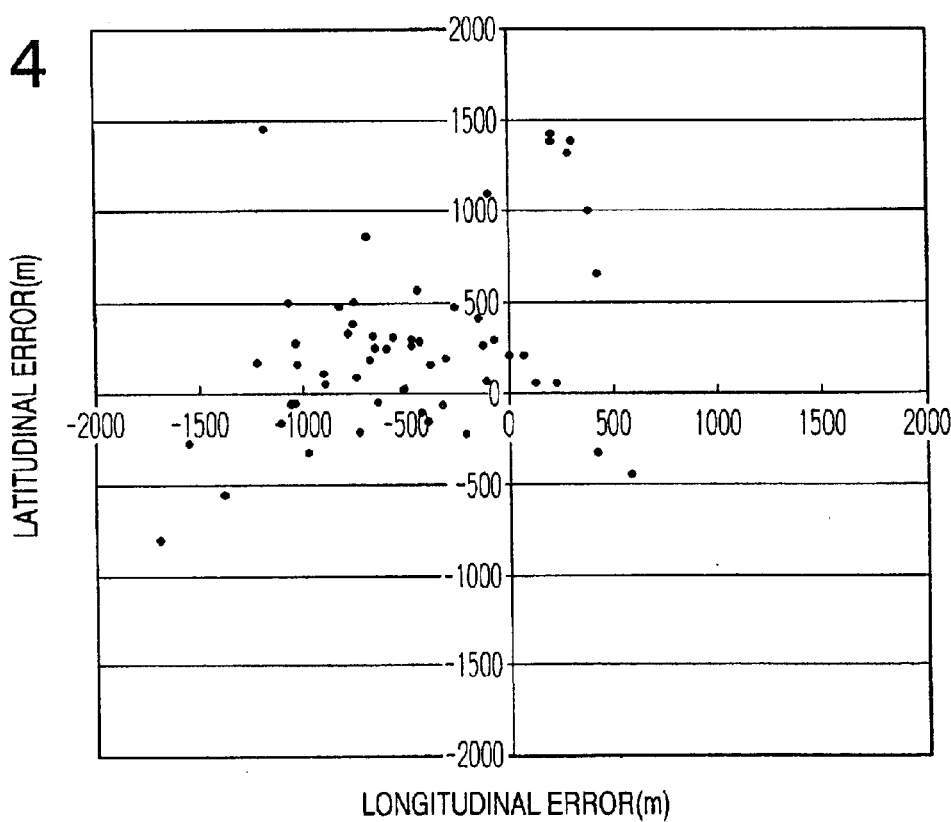
FIG. 4 is an error distribution diagram of lightning strike positions in the present invention.

In order to verify this, a test was performed in which the present invention was applied to past location results with the sampling interval used for creepage distance calculation varied. In FIGS. 3 through 8, the position of a steel tower where a lightning strike actually occurred (called the "actual lightning position") is taken as the origin, and the respective figures show plots of the amount of positional deviation of the location results in coordinates with a common scale. FIG. 3 shows the results obtained using a conventional system, while FIGS. 4 through 8 show the results obtained using the present invention with the sampling interval (spatial wavelength λ) successively set at 500 m, 1000 m, 2000 m, 3000 m and 4000 m.

Figure 5:
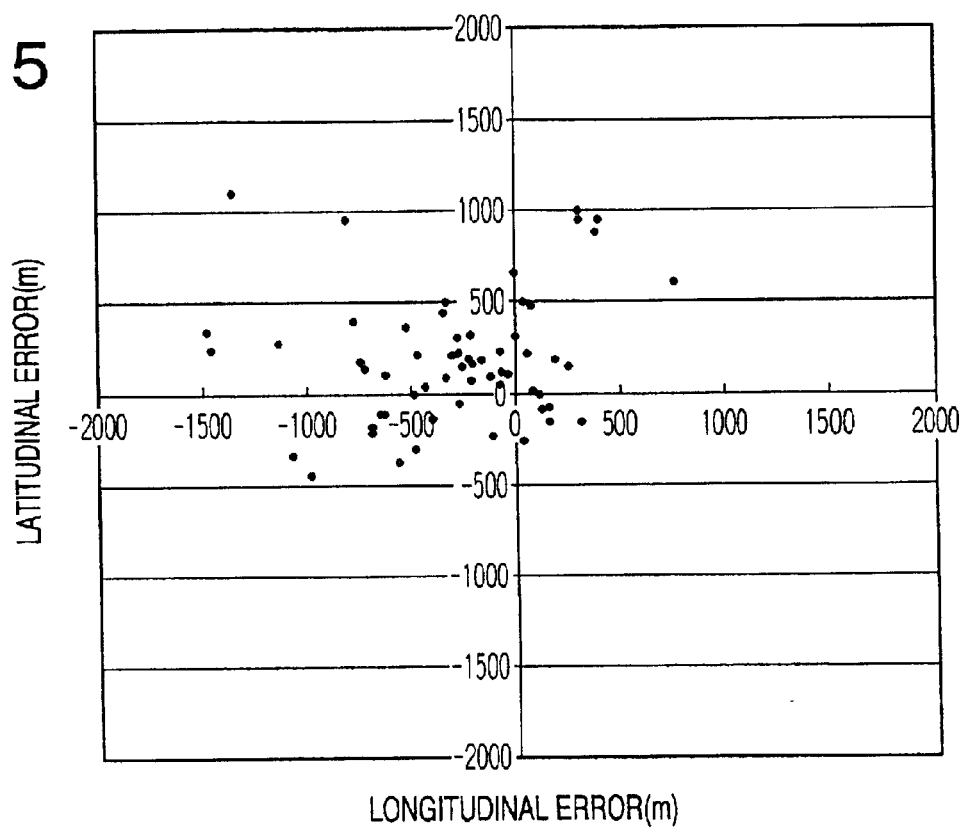
FIG. 5 is an error distribution diagram of lightning strike positions in the present invention.
Figure 6:
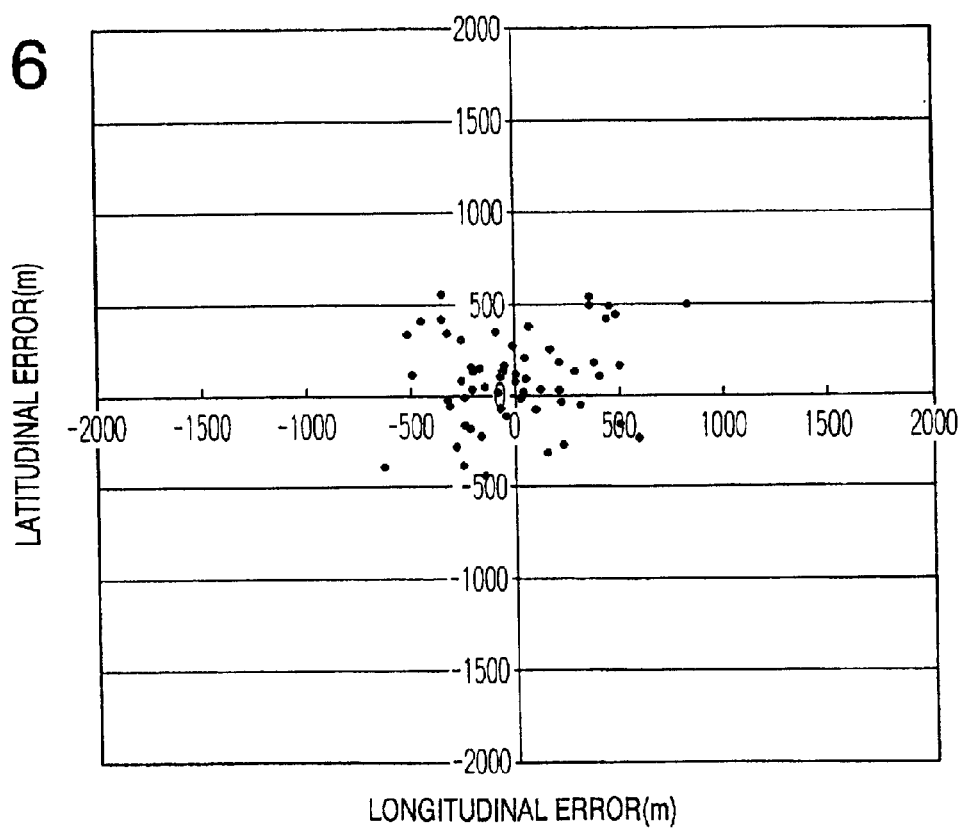
FIG. 6 is an error distribution diagram of lightning strike positions in the present invention.
Figure 7:
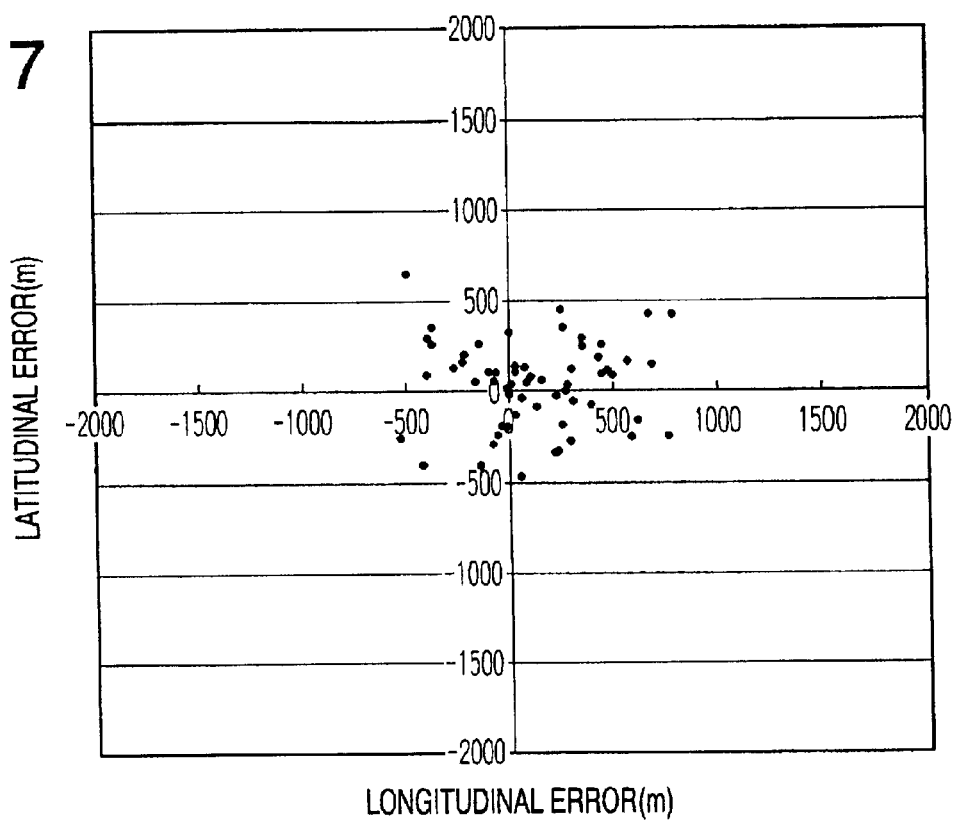
FIG. 7 is an error distribution diagram of lightning strike positions in the present invention.
Figure 8:
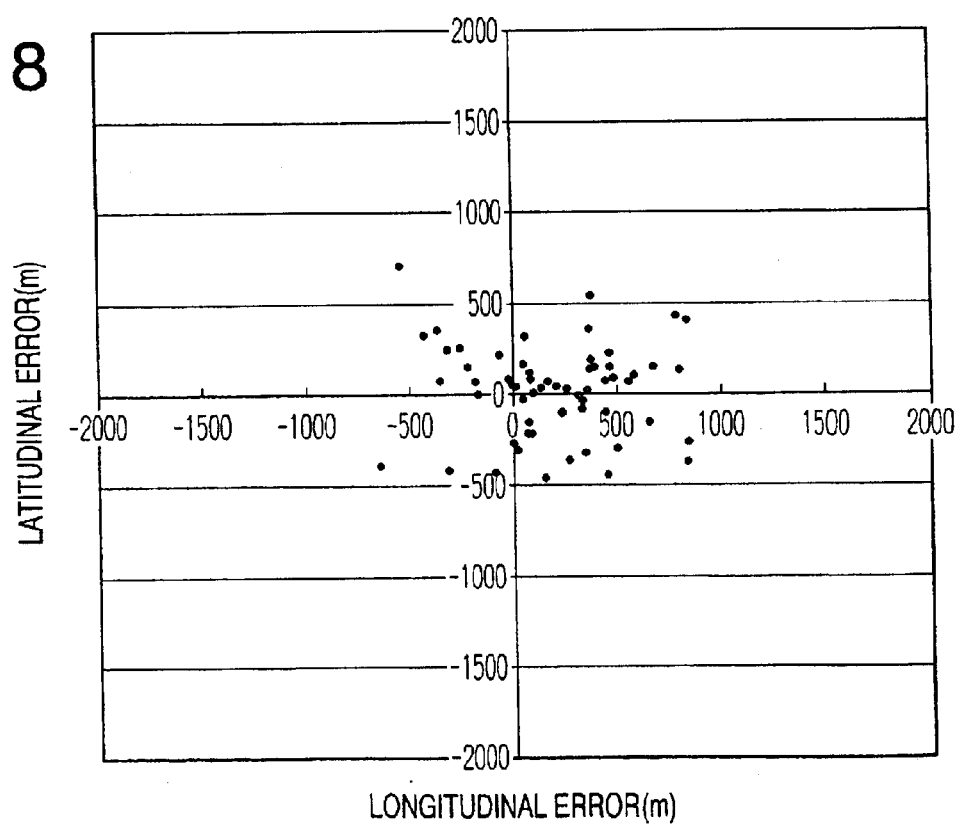
FIG. 8 is an error distribution diagram of lightning strike positions in the present invention.

In the case of the conventional system shown in FIG. 3, the plotted points overall show a positional deviation to the right from the origin, and the amount of dispersion is large. In the case of the system shown in FIG. 4 using creepage distances smoothed by λ=500 m, the plotted points overall show a positional deviation upward and to the left from the origin, and the amount of dispersion is large. In the case of FIG. 5, the overall positional deviation is small, and the dispersion is also somewhat improved. In the case of FIG. 6, i.e., in the case of smoothing by λ=2000 m, the location results are well concentrated in the vicinity of the origin, and the positional deviation is minimal. In the case of FIG. 7 (λ=3000 m) and FIG. 8 (λ=4000 m), the plotted points overall show a slight positional deviation to the right from the origin; however, the amount of dispersion is small, and it may be said that the reliability is higher than that of the conventional system.

Figure 9:
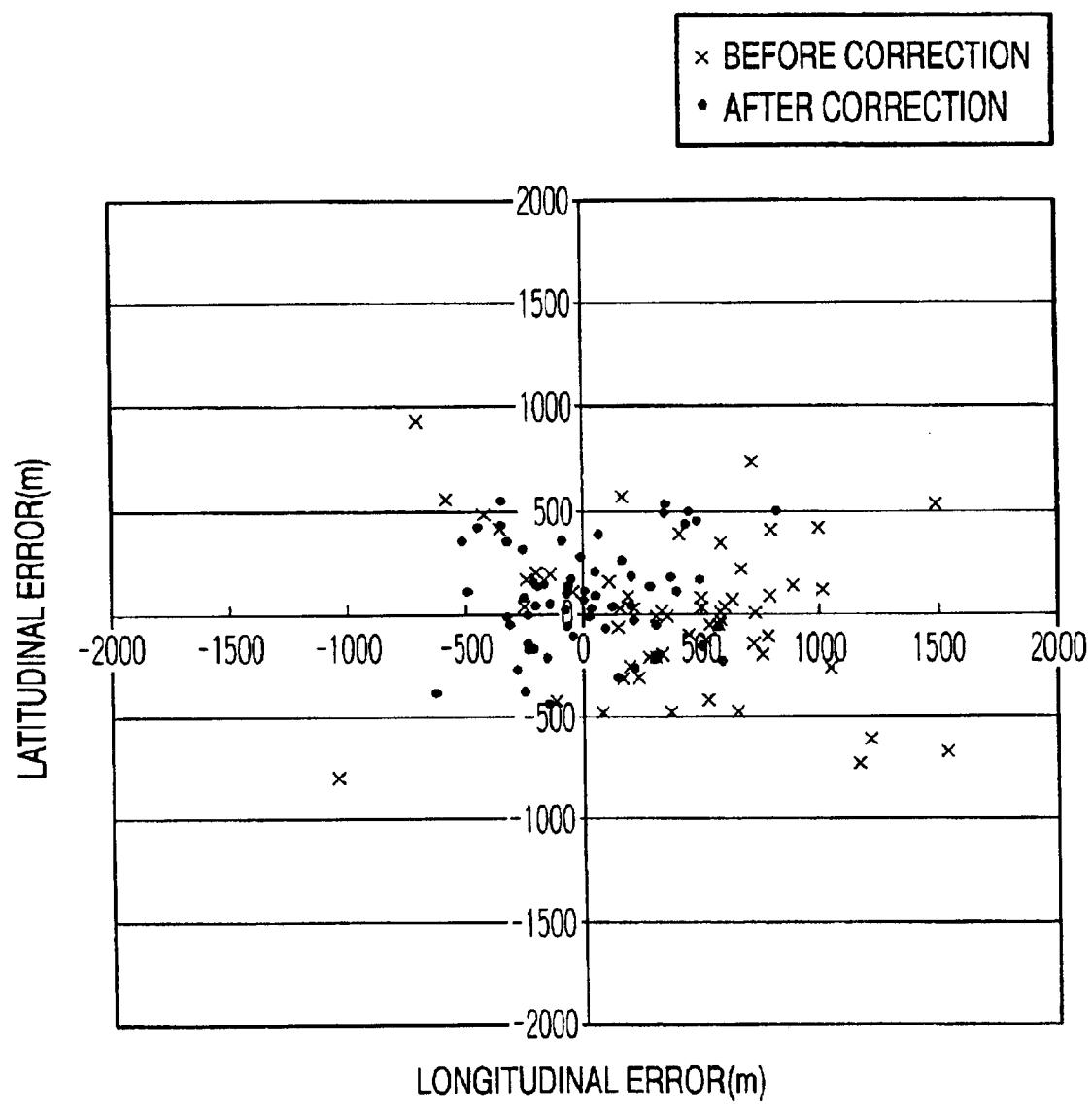
FIG. 9 is an error distribution diagram of lightning strike positions in which a conventional system and the present invention are superimposed.

FIG. 9 shows a synthesis of FIG. 3 (x marks) and FIG. 6 (black circles). The black circles show less positional deviation and dispersion than the x marks, thus indicating that lightning strike position location with a higher degree of certainty is achieved.

The above results demonstrate that desirable correction results can be obtained if the creepage distances are determined by smoothing the depressions and elevations in the ground surface to a spatial wavelength that is comparable to the wavelength of the lightning electromagnetic waves.

Since the wavelength of lightning electromagnetic waves differs in each lightning strike, this wavelength may be determined by wavelength analysis (frequency analysis) from the waveform observed by the receiving stations each time that a lightning strike is detected. However, in the present embodiment, the sampling interval is not used for a conversion to match the wavelength of the lightning electromagnetic waves in each case; instead, a sampling interval that corresponds to a known average lightning electromagnetic-wave wavelength is used in a fixed manner. As is seen from a comparison of FIGS. 6 through 8, there is no extreme error in the location results even if such a method is used.

Next, another embodiment of the present invention will be described.

Figure 10:
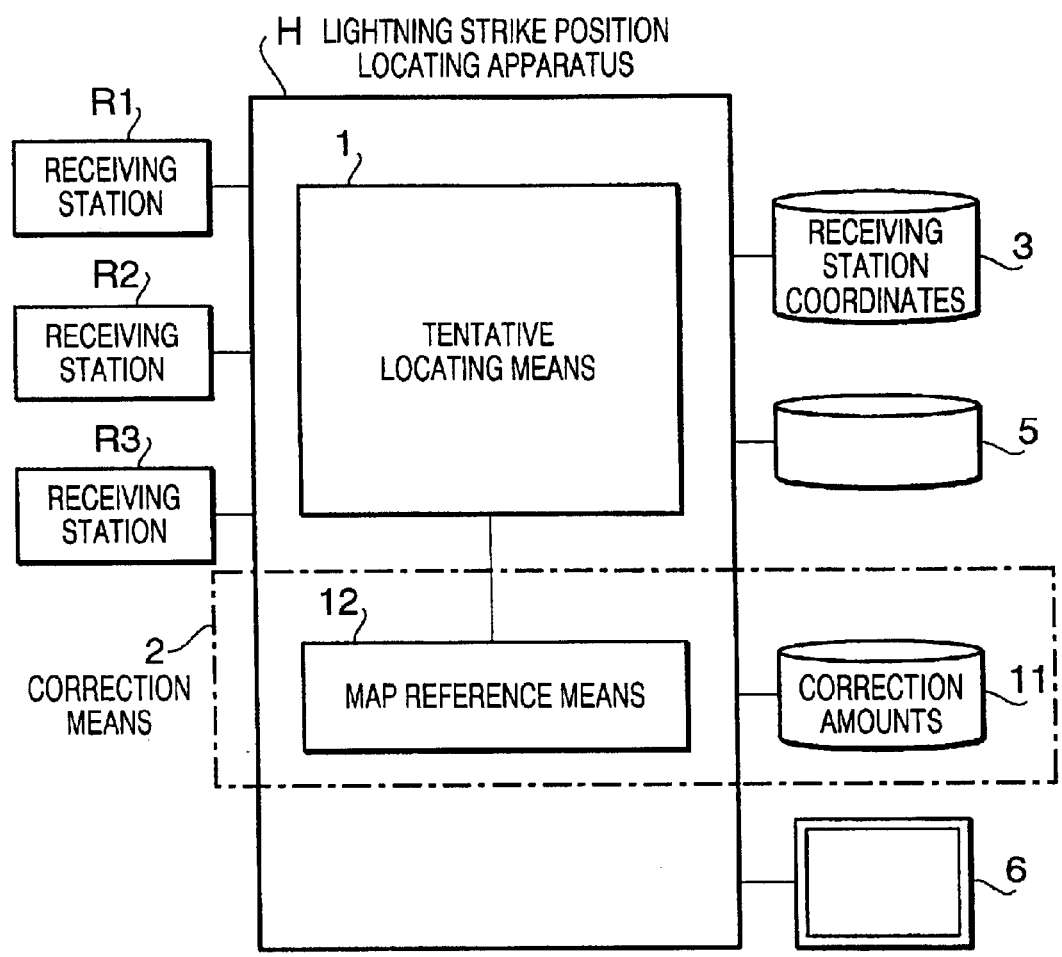
FIG. 10 is a structural diagram of a lightning strike position locating system illustrating one embodiment of the present invention.

As is shown in FIG. 10, the lightning strike position locating system of this embodiment of the present invention, like the embodiment shown in FIG. 1, comprises receiving stations R1, R2 and R3 in at least three different locations that receive the electromagnetic waves generated by the lightning strike, and a lightning strike position locating apparatus H which locates the lightning strike position by determining the difference between arrival times of the lightning electromagnetic waves at the respective receiving stations R1, R2 and R3, and using the coordinates of the respective receiving stations R1, R2 and R3 to calculate a ground point which has a difference in propagation distance that would result in such arrival time difference. Furthermore, the receiving stations R1, R2 and R3, the receiving station coordinate memory 3 and the display device 6 are the same as in FIG. 1.

The lightning strike position locating apparatus H comprises tentative locating means 1 which use the horizontal coordinates of the respective receiving stations R1, R2 and R3 as a reference to calculate a ground point having a difference in horizontal distance that would result in the above-mentioned difference between arrival times at the respective receiving stations, and which take this ground point as the tentative lightning strike position, and correction means 2 which correct the position to a lightning strike position obtained by evaluating the difference between arrival times in terms of creepage distances following depressions and elevations in the ground surface, on the basis of the above-mentioned tentative lightning strike position. As in the embodiment shown in FIG. 1, the above-mentioned conventional lightning strike position locating apparatus H' may be used as the tentative locating means 1.

The correction means 2 comprise a correction amount map 11 in which a group of regions that are spaced at fixed distances in the longitudinal and lateral directions are envisioned on a map, and a correction amount for the lightning strike position which takes into consideration the creepage distances from a representative point within the region to the respective receiving stations is set for each region beforehand, and map reference means 12 that refer to the correction amount in the region in which the tentative lightning strike position is contained, and that correct the lightning strike position by applying this correction amount to the tentative lightning strike position.

Figure 11:
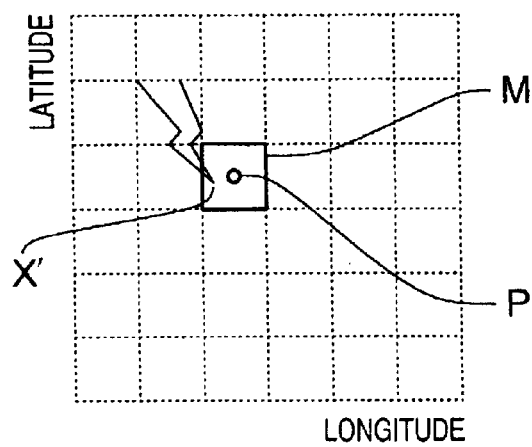
FIG. 11 is a conceptual diagram of the division of regions for the correction amount map used in the present invention.

In the present embodiment, based on the standpoint that the correction amounts that perform a correction from the tentative lightning strike position in the embodiment shown in FIG. 1 are roughly the same if these correction amounts are located within regions in which the longitudinal and lateral distances are appropriately short and narrow, the correction amounts for each narrow region are deployed on a map, and correction amounts are applied at the point in time at which the tentative lightning strike position is obtained. In the map shown in FIG. 11, a mesh is formed by specified divisions in latitude and longitude, and the correction amount at the center P of each region M is taken representatively as the correction amount for this region M. In the correction amount map 11, the correction amounts are stored in storage locations that have addresses corresponding to the regions M. For the tentative lightning strike position (located at the tip end of the lightning symbol) X' shown in the figure, the correction amount for the region M is applied as a result of this correction amount being read out from the address in question by the map reference means 12.

In cases where the tentative lightning strike position is obtained by coordinates using latitude and longitude, the correction amounts set in the correction amount map 11 are also expressed as coordinate shift amounts in latitude and longitude. As a result, corrections can be performed by simple addition. For example, in a system in which the map is split into regions in which the division in latitude and longitude is 0.00005 degrees, if the tentative lightning strike position X' is 36.50003 degrees north latitude, 139.50002 degrees east longitude, the region M in which these coordinates are contained is the region M extending from 36.50000 degrees to 36.50005 degrees north latitude, and from 139.50000 degrees to 139.50005 degrees east longitude. Assuming that the address corresponding to this region M is sought from the correction amount map 11, so that the latitudinal correction amount +0.00004 degrees and longitudinal correction amount −0.00001 degrees are obtained, then the correction result will be 36.50007 degrees north latitude, 139.50001 degrees east longitude.

In a case where receiving stations are installed in four or more locations, and three appropriate stations are used for the location process, then a plurality of correction amounts, i.e., correction amounts corresponding to the combination of the three receiving stations that are used, are set, and the system is set so that correction amounts can be referred to by the combination of receiving stations used in the tentative location process.

Furthermore, the size of the divisions in latitude and longitude used when the mesh is formed is not limited to the above-mentioned example. The correction amounts can be made more accurate by reducing the size of the divisions; accordingly, if there are no capacity limitations on the hardware that constitutes the correction amount map 11, it is desirable to reduce the size of the divisions.

In the embodiment shown in FIG. 10, the construction of the lightning strike position locating apparatus H is simpler than in the embodiment shown in FIG. 1, and the processing time is also shorter. Because, as long as the correction amount map 11 is prepared, corrections can be simply accomplished merely by referring to the correction amount map 11 and adding correction amounts. If the map data base 4 and coordinates of the receiving stations R1, R2 and R3 are available, the correction amount map 11 can be constructed by calculation, and can be used semi-permanently as long as there are no fluctuations in topography or movement or new installation of receiving stations. Furthermore, the correction amount map 11 need not be incorporated into the interior of the lightning strike position locating apparatus H; this map may be accessed by means of a communications circuit.

Figure 12:
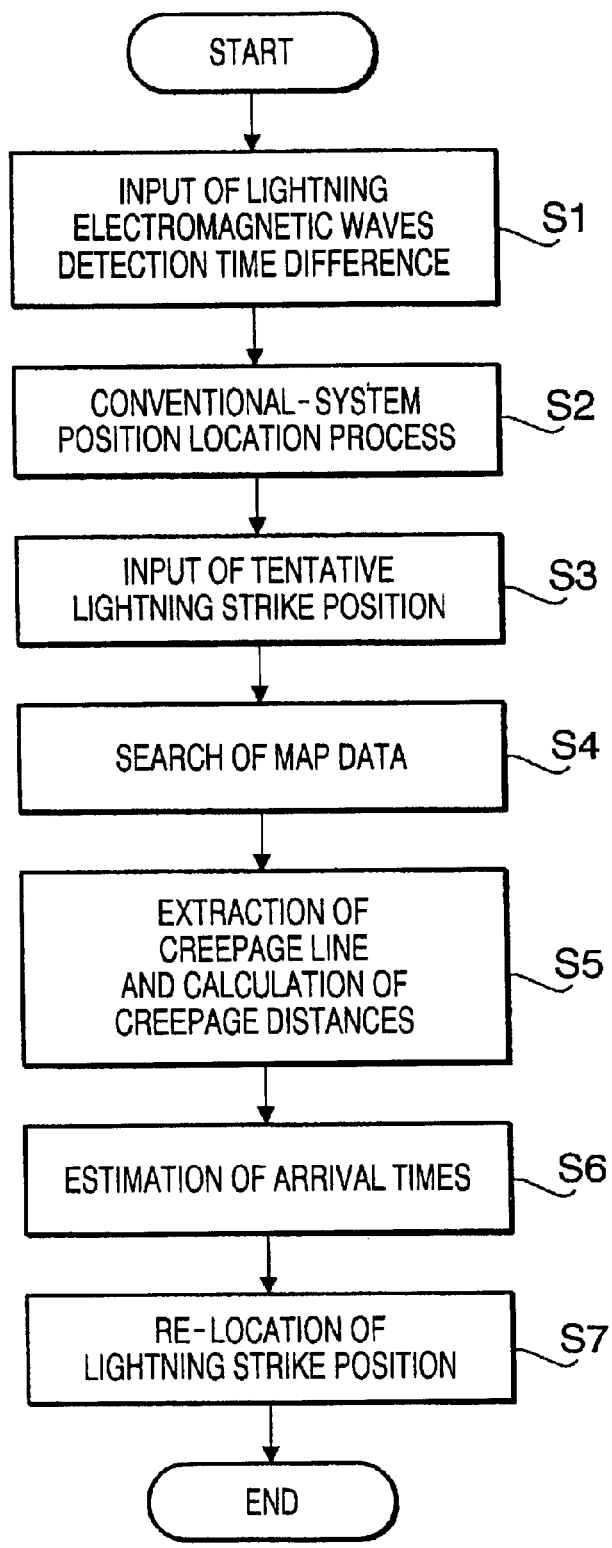
FIG. 12 is a flow chart of the lightning strike position locating program of the present invention.
Figure 13:
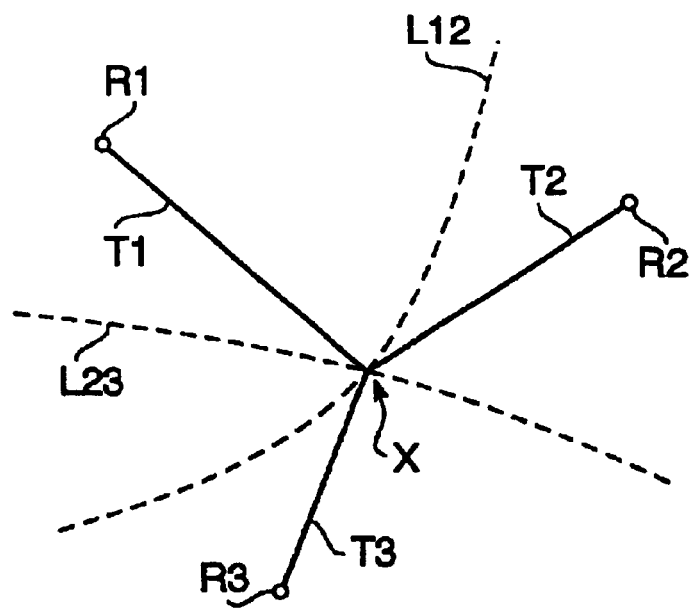
FIG. 13 is a conceptual diagram of an arrival time difference system.
Figure 14:
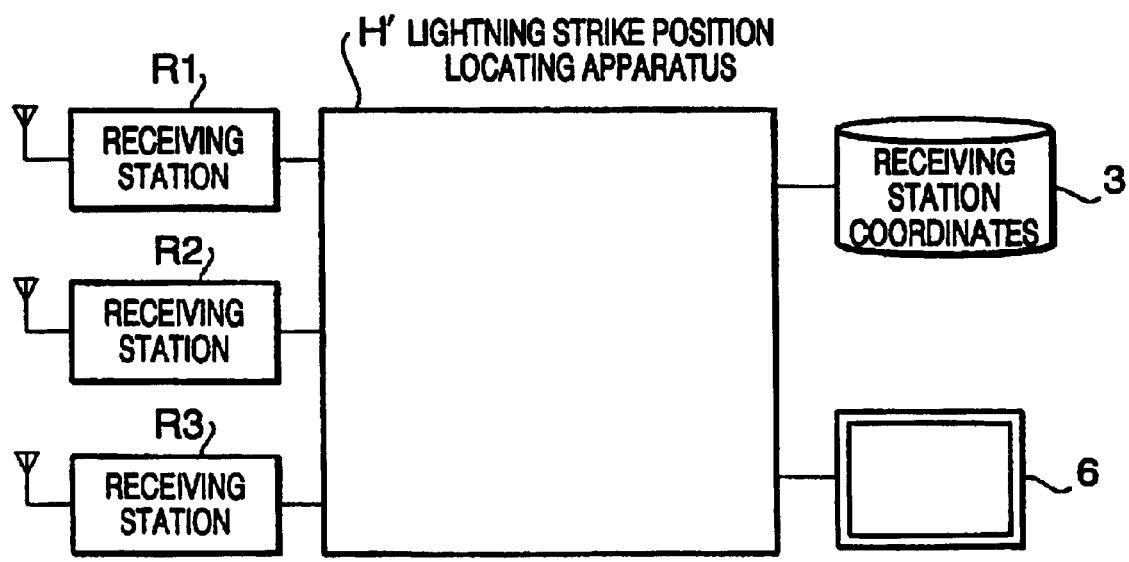
FIG. 14 is a structural diagram of a convention liquid pressure sensor locating system.

The lightning strike position locating system of the present invention can be realized by causing a programmed computer to perform the necessary procedures. Specifically, as is shown in FIG. 12, a program is prepared which causes a computer to perform a time input procedure S1 in which the respective instants in time at which lightning electromagnetic waves are detected are input from receiving stations in three different locations, a conventional-system locating procedure S2 in which the difference between arrival times at the receiving stations in three different locations is viewed as a difference in horizontal distance, an input procedure in which the result of this location process is input as the tentative lightning strike position, a map data search procedure S4 which searches the map data base, a creepage line extraction procedure S5 which determines creepage lines, a creepage distance calculating procedure S5 which determines creepage distances, an arrival time estimating procedure S6 which estimates the times at which horizontal electromagnetic waves should arrive at the respective receiving stations from ground points on line connecting the tentative lightning strike position and the respective receiving stations, a re-locating procedure S7 which re-locates the lightning strike position using the difference between these estimated arrival times, and the like. In the case of the time input procedure S1, conventional-system locating procedure S2, result display procedure (not shown in the figures) and the like, conventional programs can be used "as is".

Furthermore, the input procedure S3 that inputs the correction results produced by the conventional-system locating procedure S2 as the tentative lightning strike position, and the correction amount map reference procedure (not shown in the figures) the corrects the tentative lightning strike position by referring to a correction amount from the correction amount map, can be performed using a programmed computer.

The correction amount map 11 need not be present inside this computer. The user using this map type correction program can receive notification of lightning strike positions based on a conventional lightning strike position locating system via the internet, and can perform corrections by further receiving a map reference service. The service provider can expand the service at little cost and without greatly altering the existing system merely by preparing a correction amount map 11 that can be referred to via the internet.

Furthermore, it would also be possible to correct the tentative lightning strike position on the side of the service provider, and to notify the user of the corrected lightning strike position.

The present invention offers the following superior merits:

(1) Since the position is corrected to a lightning strike position obtained by evaluating the difference between arrival times using creepage distances, the positional deviation seen in conventional systems in which an evaluation is performed using horizontal distances can be eliminated.

(2) Since depressions and elevations in the ground surface are smoothed to a spatial wavelength that is comparable to the wavelength of the lightning electromagnetic waves, the distance (time) of actual propagation of the ground surface waves is reflected in the location results.

What is claimed is:

1. A lightning strike position locating method for locating the position of a lightning strike, comprising the steps of:
   receiving lightning electromagnetic waves at a plurality of receiving stations; and
   locating the lightning strike position on the basis of a difference between the times at which the lightning electromagnetic waves are received by the plurality of receiving stations such that the distances from the lightning strike position to the receiving stations are creepage distances following depressions and elevations in the ground surface.

2. The lightning strike position locating method according to claim 1, wherein said depressions and elevations in the ground surface are smoothed to a spatial wavelength that is comparable to the wavelength of the lightning electromagnetic waves.

3. The lightning strike position locating method according to claim 1, wherein said creepage distances are determined by smoothing the depressions and elevations in the ground surface to a spatial wavelength that is comparable to the wavelength of the lightning electromagnetic waves.

4. A lightning strike position locating method for locating the position of a lightning strike comprising the steps of:
   calculating a ground point having a difference in propagation distance that would result in such arrival time difference by using the difference between the times at which electromagnetic waves generated by the lightning strike arrive at receiving stations located in at least three different locations;
   calculating a ground point having a difference in horizontal distance that would result in such arrival time difference using the horizontal coordinates of the respective receiving stations as a reference;
   taking said ground point as a tentative lightning strike position; and,
   correcting the position to a lightning strike position on the basis of said tentative lightning strike position obtained by evaluating the arrival time difference between terms of the creepage distances following depressions and elevations in the ground surface.

5. The lightning strike position locating method according to claim 4, wherein said correction is accomplished by determining the creepage distances from the tentative lightning strike position to the respective receiving stations following depressions and elevations in the ground surface, using the ratios of these creepage distances to the horizontal distances between the tentative lightning strike position and the respective receiving stations to estimate the times at which horizontal electromagnetic waves should arrive at the respective receiving stations from ground points on lines connecting the tentative lightning strike position and the respective receiving stations, and re-locating the lightning strike position using the difference between these estimated arrival times.

6. The lightning strike position locating method according to claim 4, wherein said correction is accomplished by envisioning a group of regions that are spaced at fixed distances in the longitudinal and lateral directions on a map, setting a correction amount for the lightning strike position which takes into consideration the creepage distances from a representative point within the region to the respective receiving stations in a correction amount map for each region beforehand, using said correction amount map to refer to the correction amount in the region in which the tentative lightning strike position is contained, and correcting the lightning strike position by applying said correction amount to the tentative lightning strike position.

7. A lightning strike position locating apparatus for locating the position of a lightning strike by calculating a ground point having a difference in propagation distance that would result in such arrival time difference, the calculating being carried out by using the difference between the times at which electromagnetic waves generated by the lightning strike arrive at receiving stations located in at least three different locations said apparatus comprising:

tentative locating means that use the horizontal coordinates of the respective receiving stations as a reference to calculate a ground point having a difference in horizontal distance that would result in such arrival time difference, and taking said ground point as a tentative lightning strike position; and correction means that correct said tentative lightning position to a lightning strike position obtained by evaluating the arrival time difference in terms of the creepage distances following depressions and elevations in the ground surface, on the basis of said tentative lightning strike position.

8. The lightning strike position locating apparatus according to claim 7, wherein said correction means comprises:

creepage distance calculating means that determine the creepage distances from the tentative lightning strike position to the respective receiving stations following depressions and elevations in the ground surface;

arrival time estimating means that use the ratios of these creepage distances to the horizontal distances between the tentative lightning strike position and the respective receiving stations to estimate the times at which horizontal electromagnetic waves should arrive at the respective receiving stations from ground points on lines connecting the tentative lightning strike position and the respective receiving stations; and re-locating means that re-locate the lightning strike position using the difference between these estimated arrival times.

9. The lightning strike position locating apparatus according to claim 8, wherein said re-locating means also act as said tentative locating means.

10. The lightning strike position locating apparatus according to claim 8, wherein said creepage distance calculating means determine creepage lines that express depressions and elevations in the ground surface by smoothing elevation waveforms on lines connecting the tentative lightning strike position and the respective receiving stations, obtained by searching a map data base that provides map information including elevations, to a spatial wavelength comparable to the wavelength of the lightning electromagnetic waves, and calculate the lengths of these creepage lines as creepage distances.

11. The lightning strike position locating apparatus according to claim 8, wherein said creepage distance calculating means successively average a plurality of elevation data at a specified sampling interval in the horizontal direction provided by said map data base, and thus convert said data into elevation data at a sampling interval that is comparable to the wavelength of the lightning electromagnetic waves.

12. The lightning strike position locating apparatus according to claim 7, wherein said correction means comprises:

a correction amount map in which a group of regions that are spaced at fixed distances in the longitudinal and lateral directions are envisioned on a map, and a correction amount for the lightning strike position which takes into consideration the creepage distances from a representative point within the region to the respective receiving stations is set for each region beforehand; and map reference means that refer to the correction amount in the region in which the tentative lightning strike position is contained, and that correct the lightning strike position by applying this said correction amount to the tentative lightning strike position.

13. The lightning strike position locating apparatus according to claim 12, wherein said correction amount map is a map in which a group of regions are envisioned by dividing the longitude and latitude by specified numbers of degrees, and amounts of shift in longitude and latitude that are to be added to the tentative lightning strike position are set for each region.

14. The lightning strike position locating apparatus according to claim 12, wherein said correction amount map is a map in which correction amounts are set to correspond to sets of receiving stations located in three arbitrary locations, and said map reference means refer to correction amounts corresponding to the set of receiving stations in three different locations used in said tentative location means.

15. A lightning strike position locating system comprising:

receiving stations located in at least three different locations that receive lightning electromagnetic waves generated by a lightning strike; and a lightning strike position locating apparatus that locates the lightning strike position by determining the difference between the arrival times of the lightning electromagnetic waves at the respective receiving stations and using the coordinates of the respective receiving stations as a reference to calculate a ground point having a difference in propagation difference that would result in such arrival time difference, wherein said lightning strike position locating apparatus comprises:

tentative locating means that use the horizontal coordinates of the respective receiving stations as a reference to calculate a ground point having a difference in horizontal distance that would result in such arrival time difference, and that take said ground point as the tentative lightning strike position; and correction means that correct said tentative lightning position to a lightning strike position obtained by evaluating the arrival time difference in terms of the creepage distances following depressions and elevations in the ground surface, on the basis of said tentative lightning strike position.

16. The lightning strike position locating system according to claim 15, wherein a map data base exists that can be referred to by communications from said lightning strike position locating apparatus.

17. The lightning strike position locating system according to claim 15, wherein a correction amount map exists that can be referred to by communications from said lightning strike position locating apparatus.

18. A lightning strike position locating program for locating the position of a lightning strike by calculating a ground point having a difference in propagation distance that would result in such arrival time difference by using the difference between the times at which electromagnetic waves generated by the lightning strike arrive at receiving stations located in at least three different locations to, said program causing a computer to execute the steps comprising:

inputting a tentative lightning strike position that is obtained by calculating a ground point having a difference in horizontal distance that would result in such arrival time difference, using the horizontal coordinates of the respective receiving stations as a reference;

searching a map data base that provides map information including elevations;

determining creepage lines that express depressions and elevations in the ground surface by editing elevation waveforms on lines that connect the tentative lightning strike position and the respective receiving stations as obtained from said map information and converting these elevation waveforms to a sampling interval that is comparable to the wavelength of the lightning electromagnetic waves;

determining surfaces distances by a distance integration of these creepage lines;

estimating times at which horizontal electromagnetic waves should arrive at the respective receiving stations from ground points on lines connecting the tentative lightning strike position and the respective receiving stations by using the ratios of these creepage distances to the horizontal distances between the tentative lightning strike position and the respective receiving stations; and re-locating the lightning strike position by using the difference between these estimated arrival times.

19. The lightning strike position locating program according to claim 18, wherein said input procedure inputs said tentative lightning strike position by communications over the internet or the like.

20. A lightning strike position locating program for locating the position of a lightning strike by calculating a ground point having a difference in propagation distance that would result in such arrival time difference by using the difference between the times at which electromagnetic waves generated by the lightning strike arrive at receiving stations in at least three different locations, said program causing a computer to execute the steps comprising:

inputting a tentative lightning strike position obtained by calculating a ground point having a difference in horizontal distance that would result in such arrival time difference, using the horizontal coordinates of the respective receiving stations as a reference;

referring to a correction amount in the region containing the tentative lightning strike position using a correction amount map in which a group of regions that are spaced at fixed distances in the longitudinal and lateral directions are envisioned on the map, and a correction amount for the lightning strike position which takes into consideration the creepage distances from a representative point within the region to the respective receiving stations is set beforehand for each region; and correcting the lightning strike position by applying said correction amount to the tentative lightning strike position.

* * * * *